United States Patent
Xu et al.

(10) Patent No.: US 11,681,544 B2
(45) Date of Patent: *Jun. 20, 2023

(54) INTERFERENCE-AWARE SCHEDULING SERVICE FOR VIRTUAL GPU ENABLED SYSTEMS

(71) Applicant: VMware, Inc., Palo Alto, CA (US)

(72) Inventors: Xin Xu, San Bruno, CA (US); Na Zhang, Melrose, MA (US); Xiaolong Cui, Medford, MA (US); Jiayuan He, Austin, TX (US); Ridhi Surana, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/395,147

(22) Filed: Aug. 5, 2021

(65) Prior Publication Data
US 2021/0373930 A1 Dec. 2, 2021

Related U.S. Application Data

(63) Continuation of application No. 16/432,108, filed on Jun. 5, 2019, now Pat. No. 11,113,093.

(51) Int. Cl.
| G06F 9/455 | (2018.01) |
| G06N 20/00 | (2019.01) |
| G06F 11/34 | (2006.01) |
| G06F 11/30 | (2006.01) |

(52) U.S. Cl.
CPC ........ *G06F 9/45558* (2013.01); *G06F 11/301* (2013.01); *G06F 11/3433* (2013.01); *G06N 20/00* (2019.01); *G06F 2009/45595* (2013.01)

(58) Field of Classification Search
CPC .............. G06F 9/45558; G06F 11/301; G06F 11/3433
See application file for complete search history.

(56) References Cited

U.S. PATENT DOCUMENTS

| 2012/0081373 A1* | 4/2012 | Li | G06F 9/4893 345/520 |
| 2013/0191612 A1* | 7/2013 | Li | G06T 15/005 712/30 |
| 2014/0181807 A1* | 6/2014 | Fonseca | G06F 9/5083 718/1 |
| 2020/0145299 A1* | 5/2020 | Do | H04L 41/0816 |

OTHER PUBLICATIONS

Leiming Yu; Multilevel Interference-aware Scheduling on Modern GPUs; Apr. 2019 (Year: 2019).*
Xin Xu; Characterization and Prediction of Performance Interference on Mediated Passthrough GPUs for Interference-aware Scheduler; Jul. 2019; (Year: 2019).*

* cited by examiner

*Primary Examiner* — Dong U Kim
(74) *Attorney, Agent, or Firm* — Thomas Horstemeyer, LLP

(57) ABSTRACT

Disclosed are aspects of interference-aware virtual machine assignment for systems that include graphics processing units (GPUs) that are virtual GPU (vGPU) enabled. In some examples, an interference function is used to predict interference for assignment of a workload to a graphics processing unit (GPU). The interference function outputs a predicted interference to place the workload on the GPU. The workload is assigned to the GPU based on a comparison of the predicted interference to a plurality of predicted interferences for the workload on various GPUs.

20 Claims, 3 Drawing Sheets

US 11,681,544 B2

INTERFERENCE-AWARE SCHEDULING SERVICE FOR VIRTUAL GPU ENABLED SYSTEMS

CROSS-REFERENCE TO RELATED APPLICATIONS

This application claims priority to and the benefit of U.S. application Ser. No. 16/432,108, filed on Jun. 5, 2019 and entitled "INTERFERENCE-AWARE SCHEDULING SERVICE FOR VIRTUAL GPU ENABLED SYSTEMS," which is hereby incorporated herein by reference in its entirety.

BACKGROUND

A cluster can include a collection of hosts in which processor, memory, storage, and other hardware resources are aggregated for utilization. A host is capable of running one or more virtual computing instances, such as virtual machines (virtual machines). A virtual machine can include an operating system (OS) running one or more applications to perform a workload. Virtual machines running on a host can utilize host resources to perform the workloads. However, if a virtual machine is placed on a host with insufficient resources available to meet the resource demands of the virtual machines, the host becomes overloaded.

In some existing solutions, one or more virtual machines on an overloaded host can be relocated to a different host in the cluster in an attempt to remediate the overloaded host. A scheduling service is utilized in some systems to select a host for placement of virtual machines and balance the resource utilization among the hosts in the cluster. However, these placement decisions are frequently made based on insufficient information regarding resource demands of the virtual machines and resource availability of the hosts. This can result in sub-optimal placement of virtual machines, unbalanced hosts, network saturation, overloading of network links, and/or overall inefficient utilization of available resources.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
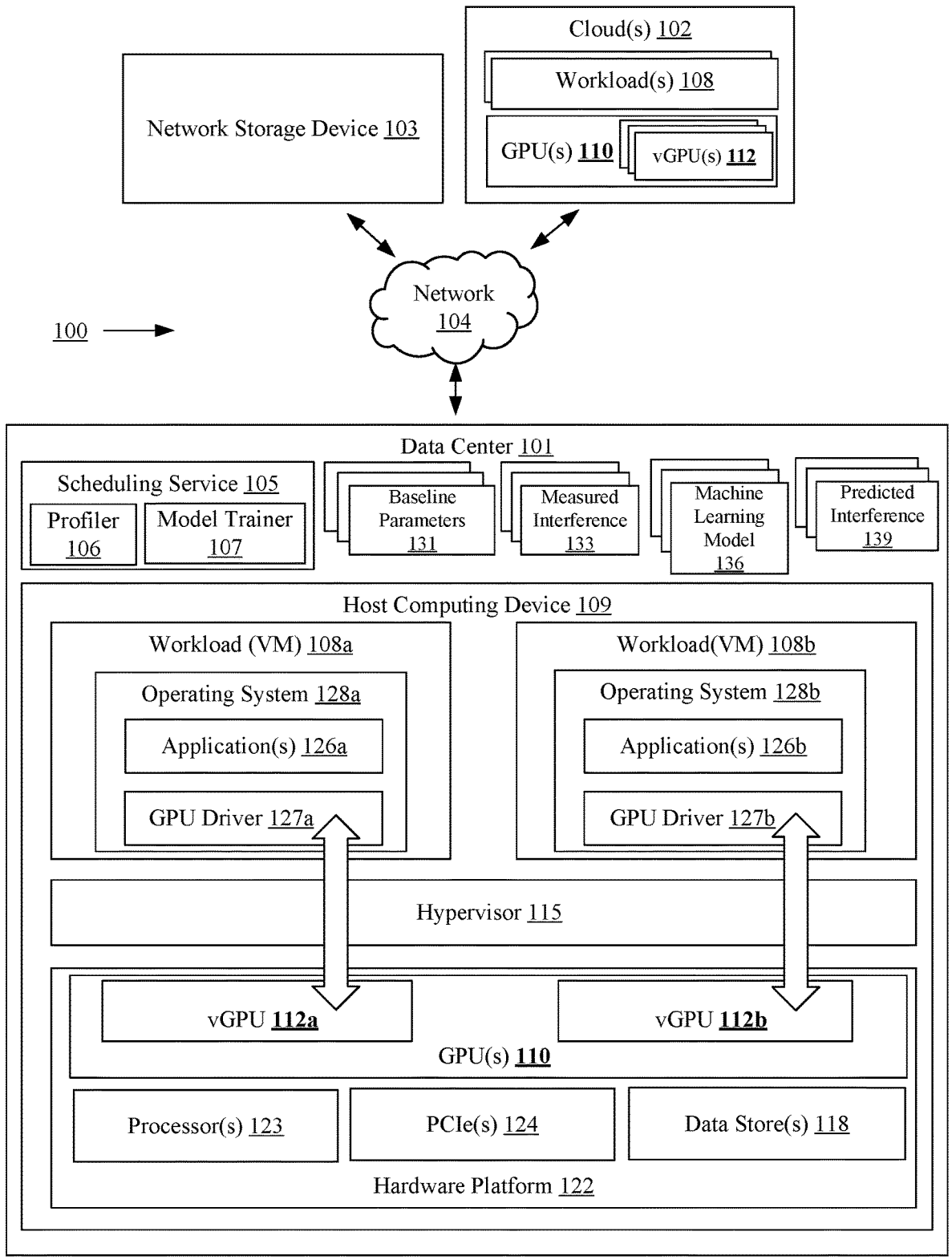
FIG. 1 is a block diagram illustrating an example of a networked environment that includes a data center, a cloud, and a data store in communication over a network.

The present disclosure relates to interference-aware virtual machine assignment for systems that include graphics processing units (GPUs) that are virtual GPU (vGPU) enabled. Virtual GPU enabled systems can include data centers and cloud computing services. These systems can perform workloads such as virtual machines that can share a single GPU or a set of GPUs in a vGPU enabled architecture. The workloads that share the GPUs can be configured manually by a user or automatically. In virtual environments, multiple workloads may use a vGPU enabled GPU at the same time, which can cause interference with each other. Workloads can be assigned or re-assigned to virtual GPUs dynamically based on a measure of interference between workloads. As disclosed herein, a solution can be provided to improve the performance of vGPU enabled systems by interference-aware scheduling of workloads to GPUs in cloud environments or environments with multiple servers, each with one or more GPUs.

A workload can include an application, task, or other instructions implemented by a virtual machine. The workload can be profiled by executing the workload or virtual machine without interference or un-interfered on a vGPU enabled GPU in a test environment. For example, the workload can be executed alone on a vGPU enabled GPU. Benchmarks collected from the non-interference test environment can be considered baseline parameters of the workload.

These parameters can include CPU utilization, GPU utilization, PCIe bandwidth utilization, network utilization, memory utilization, and other metrics. Each parameter can be classified under a predetermined number of levels according to utilization. For example, low CPU, medium CPU, and high CPU, and the like. Kernel length of each application can also be measured, for example, based on execution time. Kernel length of an application can be indicated as short kernel and long kernel. Short kernel can indicate kernels that complete within a single time slice, while long kernels take more than one time slice to complete. Where a time slice is 1 ms, a short kernel application can be those with less than or equal to 1 ms run time. A long kernel can indicate a run time of greater than 1 ms.

The baseline parameters are stored with a label or identifier of the workload so that they can be retrieved by the scheduling service. A number of workloads or workload types can be tested for interference run time. Interference run time can represent run time of a particular workload or workload type when co-located with another workload or workload type. Co-located workloads can have diminished performance based on interference. A workload can be executed while co-located on the same vGPU enabled GPU as each of the other workloads in order to measure run time overhead, or a difference between baseline run time and interference run time. A machine learning model can be trained to generate a function that identifies run time overhead based on the other parameters of the workload. At scheduling stage, a scheduling service can obtain statistics from a datastore and use the machine learning model to evaluate predicted interference on all possible GPUs, and place the workload on the host and GPU with least interference.

FIG. 1 shows an example networked environment 100 including a data center 101, a cloud 102, and a data store 118 in communication over a network 104. Data center(s) 101 can be representative of one or more data centers 101. Data centers 101 can include heterogeneous systems that utilize more than one kind of processor, core, or coprocessor. The data centers 101 can also use multiple instruction-set architectures (ISA). Data centers 101 can include multiple different accelerators, including GPUs 110, field-programmable gate arrays (FPGAs) and application specific integrated circuits (ASICs). The networked environment 100 can be utilized to provide interference-aware placement of workloads 108 in virtual GPU enabled systems. A workload 108 with GPU 110 requirements can be assigned to a vGPU 112 in a data center 101 or a cloud 102.

The data center 101 can include one or more clusters of host computing devices 109. The host computing device 109 can include vGPU-enabled GPUs 110, which can be NVIDIA® GPUs or other vGPA-enabled GPUs 110. The GPUs 110 can include a number of virtual GPUs (vGPUs) 112. The data center 101 can execute a scheduling service 105 that is capable of workload assignments for virtual GPU enabled systems. The scheduling service 105 can assign workloads, including individual workloads 108 to particular GPUs 110. A GPU 110 can include architecture that supports vGPUs 112. The workloads 108 can be hosted in the data center 101 or the cloud 102. The GPU 110 can include hardware provided by the data center 101 or the cloud 102.

The scheduling service 105 can include a workload profiler 106, a model trainer 107, and other components. The profiler 106 and the model trainer 107 can also be separate applications that work in concert with the scheduling service 105. The profiler 106 can execute a training set of applications or workloads 108 alone on a GPU 110 or otherwise un-interfered to determine its baseline parameters 131. Once the baseline parameters 131 are identified, the profiler 106 can execute a workload 108 alongside each of the other workloads 108 of the set to determine the measured interference 133 between the individual workloads 108. For example, the workload 108 can be executed while co-located on the same GPU 110 with another one of the workloads 108 in the training set. The measured interference 133 can be a difference between baseline run time and interference run time. Machine learning models 136 can be trained to generate model functions that output predicted interferences 139 as a function of the baseline parameters 131 for the workload 108 to be placed, and the co-located workload(s) 108. The machine learning model 136 and model function with minimum error can be chosen to generate predicted interferences 139. The scheduling service 105 can then place workloads 108 on a GPU 110 that results in minimum interference for a particular workload 108.

The cloud 102 can include a cloud computing platform. For example, the cloud 102 can be implemented as a private cloud, a public cloud, or a hybrid cloud. A hybrid cloud can be a cloud that includes a public cloud and a private cloud. VMWARE® vCloud Hybrid Services (vCHS) can be an example of a hybrid cloud implementation. In some examples, the cloud 102 can run one or more virtual computing instances including the workloads 108. Cloud services associated with the cloud 102 can be provided through a network 104. The cloud services can provide computing resources.

A workload 108 can include a virtual computing instance, a container, or any other type of virtualized instance. A host can support a workload 108, a virtual computing instance, a container, and/or any other virtualized instance. The host computing devices 109 can include a Rack Scale Architecture (RSA) housing, a plurality of physical host computing devices 109, and one or more blade servers. The RSA housing or cabinet can behave as one large virtualized server, or specified host computing devices 109 within an RSA housing can be assigned to specific workloads. The workloads 108 in a cluster can include highly diverse resource requirements for central processing unit (CPU), memory, input/output (I/O), and other dimensions. Existing scheduling services can result in sub-optimal workload placements for virtual GPU-enabled systems, often as a result of interference between workloads 108 co-located on vGPUs 112 of a single GPU 110. Workloads 108 can include one or more application(s), a GPU driver, and an operating system. For example, workload 108a can include one or more application(s) 126a, a GPU driver 127a, and an operating system 128a. The operating system 128a can be a guest operating system of the workload 108a. Likewise, the workload 108b can include one or more application(s) 126b, a GPU driver 127b, and an operating system 128b. The instructions, when executed by processors including the processors 123 and the GPUs 110, can perform functionality on the host computing device 109. While the scheduling service 105 can generate baseline parameters 131 for a workload 108, the scheduling service 105 can also generate baseline parameters 131 according to applications 126 executed in the workload 108.

The network 104 can include a Wide Area Network (WAN) accessible to the public, such as the Internet. The cloud 102 can be provided through one or more physical host computing devices, as discussed regarding the host computing devices 109 of the data center 101. The data center 101 can be equipped with vGPUs 112, which can include a NVIDIA® vGPU or other vGPU solutions. In some cases, the data center 101 can be considered part of the cloud 102. In other examples, the data center 101 that executes the scheduling service 105 can be considered separate from the cloud 102.

The host computing device 109 can include desktop personal computers, kiosks, tabletop devices, industrial control devices, and servers. The host computing device 109 can be implemented as a blade server within a RSA. The host computing device 109 can be a VMWARE® ESXi host. The host computing device 109 can represent any device executing instructions, such as application(s) implemented in the workloads 108, operating system(s), operating system functionalities, and other functionalities associated with the host computing device 109. A cluster can include a group of two or more physical host computing devices 109. The host computing device 109 or cluster can include VMWARE® vSphere.

The host computing device 109 can include user interface devices. In some examples, the user interface devices can include a graphics card for displaying data to the user and receiving data from the user. The user interface devices can also include computer-executable instructions—for example, a driver, for operating the graphics card. Further, the user interface devices can include computer-executable instructions such as a driver for operating the display. User interface devices can be shown on a display such as a touch screen display or natural user interface. The user interface devices can include speakers, sound cards, cameras, microphones, vibration motors, accelerometers, BLUETOOTH communication modules, global positioning system (GPS) hardware, and photoreceptive light sensors.

The scheduling service 105 can include an interference-aware task scheduling service. The scheduling service 105 can execute on one or more computing devices associated with the data center 101, such as a host computing device 109 in a set of host computing devices 109. The scheduling service 105 can also execute in the cloud 102. The scheduling service 105 can optimize the assignment of a workload 108 to a particular GPU 110 that includes vGPUs 112. While some examples provided in the present disclosure refer to assignments of workloads 108, the scheduling service 105 can also assign other types of tasks. The scheduling service 105 can assign tasks that include a group of workloads, a workload, an application, or a thread. The scheduling service 105 can assign the workload 108a to execute on a vGPU 112a, and can assign the workload 108b to execute on the vGPU 112b. The respective vGPUs 112 can be on the same GPU 110, or different GPUs 110.

A hardware platform 122 of the host computing device 109 can include the GPUs 110, processors 123, peripheral component interconnect express (PCIe) interfaces 124, other PCI interfaces 124, data stores 118, network cards, and other hardware devices. The data store(s) 118 can be implemented as any type of data storage, including, but without limiting, a hard disk, optical disk, a redundant array of independent disks (RAID), a solid state drive (SSD), a flash memory drive, a storage area network (SAN), or any other type of data storage device. The data store(s) 118 can include rotational storage, such as a disk. The data store(s) 118 can also include non-rotational storage media, such as SSD or flash memory. The data store(s) 118 can provide a shared data store that is accessible by two or more physical hosts in the cluster. The networked environment 100 can include a remote data storage device, such as network storage device 103. The network storage device 103 can be accessible by the set of host computing devices 109 through the network 104. Networking resources can include on-host and off-host components. The on-host components can include physical network interface controllers (NIC). The off-host components can include a switch and a rack. The host computing devices 109 can include a single host computing device, as well as two or more host computing devices in a cluster. The processor(s) 123 can include any quantity of processing units and can execute computer-executable instructions for implementing the described functionalities. The instructions can be performed by the processor or by multiple processors within the host computing device 109 and can be performed by a processor that is external to the host computing device 109.

The host computing device 109 can represent an example of mediated passthrough operation for virtual GPU enabled GPUs 110. In the mediated passthrough operation, the scheduling service 105 can assign the workload 108a to the vGPU 112a and the workload 108b to vGPU 112b. The operating system 128a can use a GPU driver 127a to control a vGPU device 112a, while the operating system 128b can use a GPU driver 127b to control a vGPU device 112b. Accordingly, mediated passthrough operation can provide for execution of a workload 108 on a vGPU 112 of a particular GPU 110.

The hypervisor 115 can include a workload monitor that creates and runs one or more workloads 108, such as workload 108a and workload 108b. The hypervisor 115 can be implemented as a vSphere hypervisor. A vGPU manager component can be installed and executed in the hypervisor 115 layer and can virtualize the underlying physical GPUs 110. For example GPUs 110, including NVIDIA® Pascal and others, can offer virtualization for both graphics and GPGPU (CUDA) applications.

NVIDIA® vGPU solutions can allow multiple workloads 108 to share a GPU 110 with a balance among performance, security and isolation. In vGPU or mediated passthrough mode, virtual machines or workloads 108, time-share the GPU compute resources by time-slicing and hardware preemption (supported since the NVIDIA® Pascal architecture). In any given time slice, only one workload 108 runs on the GPU 110. All GPU cores of the GPU 110 are given to this workload 108 during the time slice, even if it does not use all of the cores. The GPU internal memory can be statically partitioned among workloads 108 based on vGPU profile. For example, NVIDIA® Tesla P100 16 GB GPU 110 can support 1 GB, 2 GB, 4 GB, 8 GB, or 16 GB vGPU profiles. A 1 GB profile can support up to 16 workloads 108, each with 1 GB of the total 16 GBs of the GPU 110. A 2 GB profile can support up to 8 workloads, a 4 GB profile can support 4 workloads, an 8 GB profile can support 2 workloads, and a 16 GB profile can support a single workload.

NVIDIA® vGPU can include three policies that determine how time slices are allocated, including Best effort, equal share, and fixed share. In best effort policy, each workload 108 can use GPU cycles until its time slice is over, or until its job queue is empty. That is, GPU cycles are distributed among all workloads 108 that are running CUDA applications. For equal share, the amount of cycles given to each vGPU 112 is determined by the current number of power-on workload 108 virtual machines, regardless of whether these workloads are running CUDA or GPU-utilizing applications or not. For fixed share, the amount of cycles given to each vGPU 112 is determined by the total number of supported workloads 108 under the given profile, regardless of if other workload 108 virtual machines are powered on or not. In some examples, the best-effort policy can be chosen while using the scheduling service 105.

The NVIDIA® Pascal architecture context switch between time slices can be enforced by hardware preemption. Context switches occur more often in vGPU 112, and longer kernels can be more likely to suffer from the context switches. The duration between hardware enforced context switches can refer to a time slice. In some cases, we can define threshold run times for long kernel and short kernel categories based on the time slice. Accordingly, the long kernel and short kernel categories can vary based on the enforced context switching time of a vGPU-enabled GPU 110. In some cases, the context switching time can be 1 ms.

Figure 2:
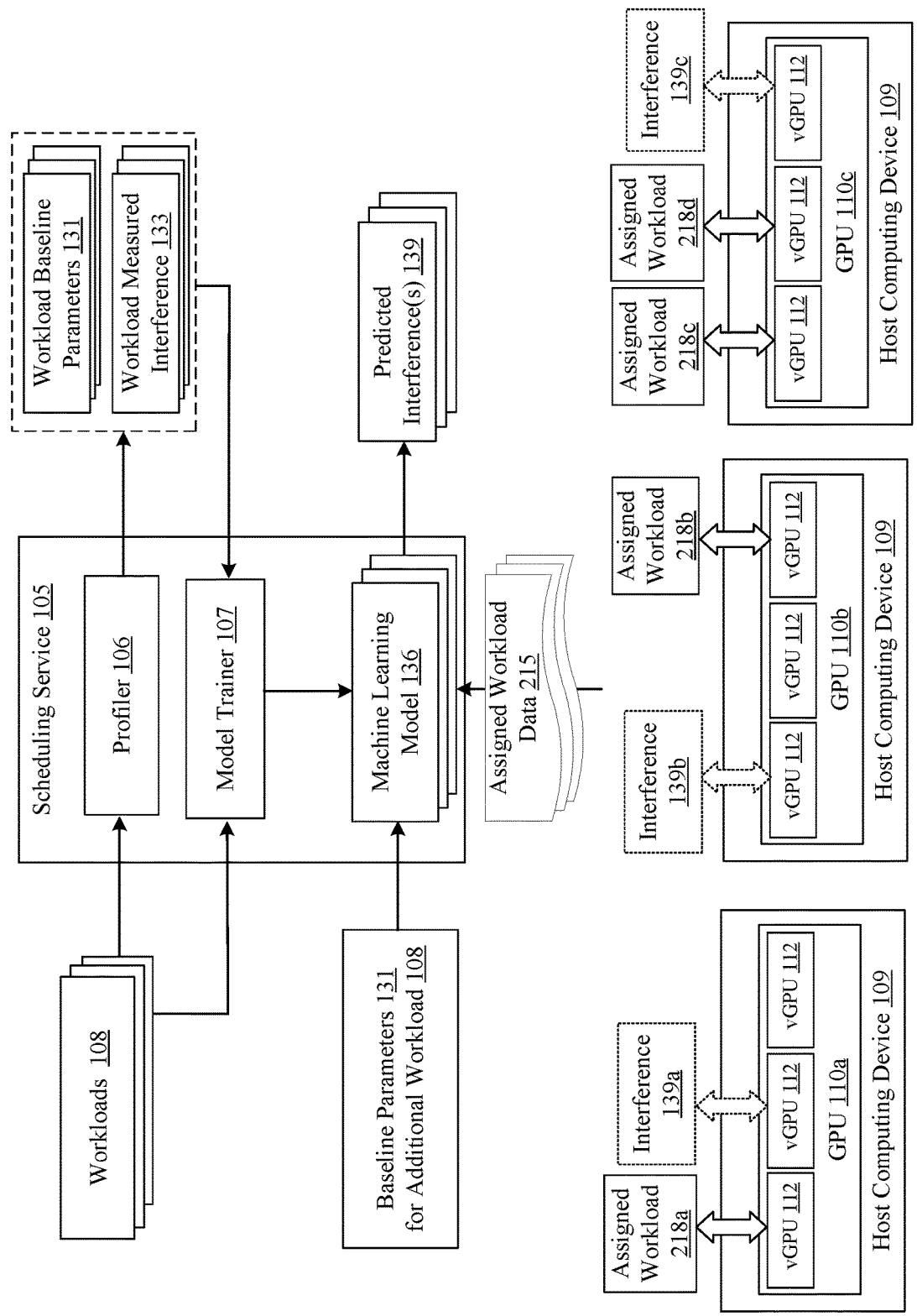
FIG. 2 is a drawing that illustrates an example of functionalities performed by a scheduling service in the networked environment.

FIG. 2 illustrates an example of the operation of a scheduling service 105. The scheduling service 105 can place workloads 108 on a selected host computing device 109 a particular vGPU-enabled GPU 110. The scheduling service 105 can include a profiler 106, a model trainer 107, and other components.

The profiler 106 can execute a training set of workloads 108 alone on a GPU 110 or otherwise without interference to determine its baseline parameters 131. Once the baseline parameters 131 are identified, the profiler 106 can execute a workload 108 alongside each of the other workloads 108 of the set to determine a set of measured interferences 133 for the workload 108. For example, the workload 108 can be executed while co-located on the same GPU 110 with another one of the workloads 108 in the training set. The set of measured interferences 133 can include a respective interference between the workload 108 and each of the other workloads 108 of the training set. The respective measured interference 133 can be a difference between baseline run time and interference run time for the workload 108 while co-located with respective ones of the other workloads 108 of the training set.

The baseline parameters 131 can include a number of measured parameters including utilization of CPU, memory, GPU, GPU memory, PCIe bandwidth, network I/O, and other metrics. Each parameter can be classified under a predetermined number of levels according to utilization level. For example, low CPU utilization, medium CPU utilization, high CPU utilization, low memory utilization, medium memory utilization, high memory utilization, and the like. In some examples, utilization of each parameter can be set according to three predetermined threshold ranges such as low=0-25% utilization of the parameter, medium=25%-50%, and high=50%-100%. For PCIe bandwidth, the three levels can be low=5 GB/s to 7 GB/s, and medium=7 GB/s to 10 GB/s, high=over 10 GB/s. Other thresholds can be chosen. Table 1 indicates a number of possible parameters that can be utilized. In this example, each workload 108 can refer to a virtual machine implementing an application or other instructions.

TABLE 1

Example Baseline Parameter Sets

| | Parameters |
|---|---|
| Base | GPU utilization, GPU memory utilization, PCIe read bandwidth, PCIe write bandwidth |
| Extend | GPU utilization, GPU mem utilization, PCIe read bandwidth, PCIe write bandwidth, vCPU utilization, Workload(VM) memory, average number of threads, average kernel length, average long kernel length, long/short kernel ratio |
| Select | GPU utilization, PCIe read bandwidth, PCIe write bandwidth, vCPU utilization, Workload(VM) memory, average kernel length |

The baseline parameters 131 can include a set of software and hardware characteristics that are closely related to interference. The parameters in the base set, extend set, or select set represent examples of baseline parameter sets that can be used to construct and train machine learning models to predict interference. The base set includes some intuitive utilization parameters. The vCPU utilization and VM memory utilization, along with average number of threads, average kernel length, average long kernel length, long/short kernel ratio can be added to the extend set to reflect the timing of kernel executions at a high level. The extend set can be more accurate in some cases than the more limited base set. The select set can be a set of baseline parameters 131 that represents a balance between accuracy and number of parameters, which can affect collection and machine learning analysis time. Other parameter sets can also be made using any of the indicated parameters, as well as other software and hardware parameters identified from workload execution.

Kernel length of each application can be measured based on execution time. Kernel length of an application can be indicated as short kernel and long kernel. Short kernel can indicate kernels that complete within a single time slice, while long kernels take more than one time slice to complete. Where a time slice is 1 ms, a short kernel application can be those with less than or equal to 1 ms run time. A long kernel can indicate a run time of greater than 1 ms.

The baseline parameters are stored with a label or identifier of the workload so that they can be retrieved by the scheduling service. A number of workload or virtual machine types can be tested for interference run time. Interference run time can represent run time of a particular workload or workload type when co-located with another workload or workload type. A workload can be executed while co-located on the same vGPU-enabled GPU 110 as each of the other workloads in order to measure run time overhead, or a difference between baseline run time and interference run time. A machine learning model 136 can be trained to generate a function that identifies run time overhead based on the other parameters of the workload. At the scheduling stage, a scheduling service can obtain statistics from a datastore and use the machine learning model 136 to evaluate predicted interference 139 on all possible GPUs 110, and place the workload 108 on the host and GPU 110 with least interference.

The machine learning models 136 can include linear regression, logistic regression, Poisson regression, generalized linear regression, ordinary least squares regression, random forest regression, support vector machine (SVM) regression, and other regression models. The machine learning models 136 can also include random forest classification, decision tree classification, naive Bayes, and k-nearest neighbors classification models.

For regression machine learning models 136, the training set of workloads 108 can train the regression model to generate a model function to output a response variable based on a number of predictor variables. The response variable can be the predicted interference 139. The predictor variables can be the baseline parameters 131 for co-located workloads 108. Co-location can refer to the extent that the situation where multiple workloads 108 are assigned to the same vGPU-enabled GPU 110. In the example of a data center 101, the predictor variables, or inputs to the model function, can include a first set of baseline parameters 131 for a particular workload 108 to be placed, and a second set of baseline parameters 131 for an assigned workload 218 that is currently being performed in a vGPU 112 of a particular GPU 110.

For classification machine learning models 136, the training set of workloads 108 can train the classification model to generate a number of interference groups based on the baseline parameters 131 for co-located workloads 108. Each interference group can have a threshold range of measured interference. For example, a first group can be 0 to less than 0.25, a second group can be 0.25 to less than 0.5, a third group can be 0.5 to less than 0.75, a fourth group can be 0.75 to less than 1, and a fifth group can be greater than 1. Any number of interference groups can be made, and other threshold ranges can be used. The classification machine learning models 136 can be used to classify a particular workload 108 to be placed into a particular one of the interference groups based on a first set of baseline parameters 131 for a particular workload 108 to be placed, and a second set of baseline parameters 131 for an assigned workload 218 that is currently being performed in a vGPU 112 of a particular GPU 110.

In order to optimize placement for an additional workload 108 for which baseline parameters 131 are known, the scheduling service 105 can determine a predicted interference for each available GPU 110. The scheduling service 105 can determine a predicted interference 139a for the GPU 110a, a predicted interference 139b for the GPU 110b, and predicted interference 139c for the GPU 110c. While the GPUs 110a, 110b, and 110c are shown on different host computing devices 109, multiple GPUs 110 can be on a single host computing device 109. The host computing devices 109 can provide assigned workload data 215 to the scheduling service 105. The assigned workload data 215 can include individual baseline parameters 131 for each of the assigned workloads 218, including the assigned workloads 218a, 218b, 218c, and 218d.

The scheduling service 105 can determine a predicted interference 139 a by inputting the baseline parameters 131 for the particular workload 108 into a model function along with the baseline parameters 131 for the assigned workload 218a that is currently being performed on the GPU 110a. In a similar manner, the scheduling service 105 can determine the predicted interference 139b by inputting the baseline parameters 131 for the particular workload 108 into a model function along with the baseline parameters 131 for the assigned workload 218b that is currently being performed on the GPU 110b. In these cases, the model function can predict one-to-one interference between the particular workload 108 and one currently-assigned workload 218.

The scheduling service 105 can also determine one-to-n predicted interference between the particular workload 108 and "n" currently-assigned workloads 218. For example, the scheduling service 105 can determine the predicted interference 139c by inputting the baseline parameters 131 for the particular workload 108 into a model function along with the baseline parameters 131 for each of the currently assigned workloads 218c and 218d of the GPU 110c. In some cases, the model function can be trained to determine one-to-one predicted interference, while multiple workloads 218c and 218d are currently executed on the GPU 110c. In this situation, the scheduling service 105 can determine respective one-to-one predicted interferences between the particular workload 108 and each of the currently assigned workloads 218c and 218d. The worst-case predicted interference of the one-to-one predicted interferences can be chosen as the predicted interference 139c.

The scheduling service 105 can place or assign the particular workload 108 to be performed on the GPU 110 that has a minimum interference. The scheduling service 105 can compare the predicted interferences 139a, 139b, and 139c to determine the minimum interference.

Figure 3:
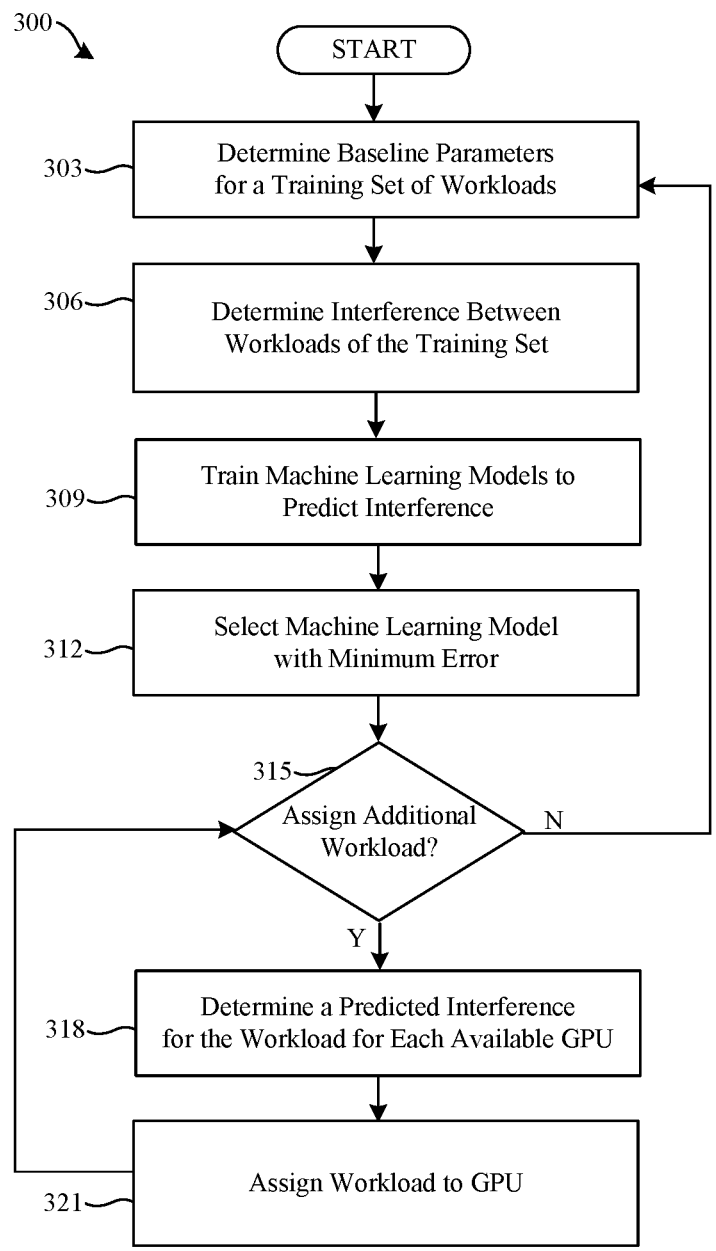
FIG. 3 is a flowchart that illustrates an example of functionalities performed by the scheduling service.

FIG. 3 shows an example flowchart 300, describing steps that can be performed by instructions executed by the data center 101. Generally, the flowchart 300 describes how the scheduling service 105 can minimize interference by assigning a workload 108 to a vGPU-enabled GPU 110 with a minimum predicted interference 139.

In step 303, the scheduling service 105 can determine baseline parameters 131 for a training set of workloads 108. In order to determine the baseline parameters 131, the scheduling service 105 can execute the training set of workloads 108 individually and alone on a GPU 110. The baseline parameters 131 can be collected using products that include VMWARE® ESXi, NVIDIA® SMI, and NVIDIA® NVPROF, when the workload 108 runs alone. Since NVPROF is not supported in vGPU mode, workloads 108 can be run in passthrough mode, rather than mediated passthrough mode, to get detailed statistics about kernels of the workloads 108. The baseline parameters 131 can include a number of measured parameters including utilization of CPU, memory, GPU, GPU memory, PCIe bandwidth, network I/O, and other metrics. The baseline parameters 131 can represent the performance of the workload 108 without any interference from co-located workloads 108 executed on another vGPU 112 of the same GPU 110. Each of the parameters can be classified under a predetermined number of levels according to utilization level, for example, according to a number of predetermined threshold percentage ranges such as low=0-25% utilization of the parameter, medium=25%-50%, and high=50%-100%.

In step 306, the scheduling service 105 can determine interference between workloads 108 of the training set. For example, the scheduling service 105 can execute a particular workload 108 alongside each of the other workloads 108 of the training set to determine a set of measured interferences 133 for the particular workload 108. The set of measured interferences 133 can include a respective interference between the particular workload 108 and each of the other workloads 108 in the training set, while co-located on the same GPU 110. A measured interference 133 can be a difference between baseline run time and interference run time. This can also be referred to as run time overhead.

In step 309, the scheduling service 105 can train a machine learning model 136 to predict interference. For example, because the actual or measured interferences 133 are known, and the baseline parameters 131 are known for every combination of two workloads 108 from the training set, a model function can be trained to output a predicted interference 139 based on inputs to the model function including a first set of baseline parameters 131 for a particular workload 108 to be placed, and a second set of baseline parameters 131 for an assigned workload 218 that is currently being performed in a vGPU 112 of a particular GPU 110. The model function can be trained to minimize an error or difference between the measured interferences 133 and the predicted interferences 139 according to the machine learning model 136. A number of machine learning models 136 can be used to train a number of model functions based on the same training set of baseline parameters 131 and measured interferences 133.

In step 312, the scheduling service 105 can select the machine learning model 136 with the lowest or minimum error. For example, the scheduling service 105 can determine an average error, median error, mode error, or another value for each model function using the training set of workloads 108. In some cases, the scheduling service 105 can confirm that the error of the selected machine learning model 136 is below a predetermined threshold. If the error is above the predetermined training threshold, the scheduling service 105 can determine additional baseline parameters 131 and measured interferences 133 for additional workloads 108. The scheduling service 105 can also test additional and/or different machine learning models 136.

The scheduling service 105 can also confirm the accuracy of the selected machine learning model 136. The accuracy of the selected machine learning model 136 can be confirmed using a validation set of workloads 108. The validation set of workloads 149 can be a different set of workloads 108 than the training set. The baseline parameters 131 and measured interferences 133 can be found in a similar manner as the training set. If the error is above the predetermined threshold, the scheduling service 105 can determine additional baseline parameters 131 and measured interferences 133 for additional workloads 108, as well as test additional and/or different machine learning models 136.

In step 315, the scheduling service 105 can check whether to assign an additional workload 108 for performance or execution in a data center 101. For example, an additional workload 108 can be added automatically or manually by an enterprise user in order to meet the GPU demands of projects, virtual machines, and other demands of the data center 101. The scheduling service 105 can check the data store 118 for baseline parameters 131 corresponding to the workload 108, or a type of the workload 108. Where the baseline parameters 131 are available, they can be accessed or retrieved from the data store 118. Where the baseline parameters 131 for the additional workload 108 are not yet known, the scheduling service 105 can execute the additional workload 108 in a GPU 110 that has no currently assigned workloads 108, and can measure the baseline parameters 131 for the additional workload 108. These baseline parameters 131 can be stored in the data store 118 in association with the additional workload or a type of the additional workload 108.

The additional workload 108 can be included in an assignment queue of workloads 108 to be assigned to a GPU 110. The scheduling service 105 can check the queue of workloads 108. If there is a queued workload 108 in the assignment queue, the scheduling service 105 can move to step 318. If no workload 108 is in the assignment queue, the scheduling service 105 can move to step 303. Continually adding additional training sets of workloads 108, determining baseline parameters 131 and measured interferences 133 can make the system more accurate.

In step 318, the scheduling service 105 can determine a predicted interference 139 between the additional workload 108 and each available GPU 110. The scheduling service 105 can determine each predicted interference 139 by inputting the baseline parameters 131 for the additional workload 108 into a model function along with the baseline parameters 131 for the currently assigned workload performed on a GPU 110. The model function can output the predicted interference 139 between the additional workload 108 in the assignment queue and each of the currently assigned workloads. This can result in a set of predicted interferences 139 corresponding to a set of available GPUs 110.

In step 321, the scheduling service 105 can assign the additional workload 108 to a GPU 110. The scheduling service 105 can minimize interference by identifying the minimum predicted interference 139 from the set of predicted interferences 139 corresponding to the set of available GPUs 110. The scheduling service 105 can then proceed to step 315 to check for more additional workloads 108 to assign or place.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drives, solid-state drives, USB flash drives, memory cards, optical discs such as compact discs (CDs) or digital versatile discs (DVDs), floppy disks, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The flowchart shows examples of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or in machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowchart shows a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described herein that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store or maintain the logic or application described herein for use by or in connection with the instruction execution system.

The computer-readable medium can include any one of many physical media, such as magnetic, optical, or semi-conductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A system comprising:
   at least one computing device comprising at least one processor; and;
   at least one data store comprising machine readable instructions, wherein the instructions, when executed by the at least one processor, cause the at least one computing device to at least:
   identify kernel length types for kernels of a respective one of at least one workload, wherein a respective kernel is identified as a short kernel or a long kernel based at least in part on a comparison of an execution time of the respective kernel to a time slice;
   provide, by a scheduling service executed by the at least one computing device, parameters comprising at least one baseline parameter for the respective one of the at least one workload currently assigned to a particular graphics processing unit (GPU) into an interference model that predicts interference between a particular workload and the at least one workload of the particular GPU in a computing environment comprising a plurality of GPUs, wherein the particular GPU uses the time slice for context switching, and the at least one baseline parameter comprises at least one parameter that is based on the kernel length types for the kernels;
identify, by the scheduling service, an output from the interference model, the output comprising a predicted interference corresponding to placement of the particular workload on the particular GPU; and
assign, by the scheduling service, the particular workload to the particular GPU based on the predicted interference corresponding to a minimum predicted interference among a plurality of predicted interferences for at least a subset of the plurality of GPUs.

2. The system of claim 1, wherein the at least one baseline parameter comprises at least one of: an average kernel length, an average long kernel length indicating an average of long kernels that execute for longer than the time slice, and a ratio between a first number of short kernels that execute within the time slice of the particular GPU and a second number of the long kernels that execute for longer than the time slice length.

3. The system of claim 2, wherein the at least one baseline parameter further comprises at least one of: a GPU utilization, a peripheral component interconnect express (PCIe) read bandwidth, a PCIe write bandwidth, a virtual central processing unit (vCPU) utilization, and a workload memory utilization for the at least one workload.

4. The system of claim 1, wherein the machine readable instructions, when executed by the at least one processor, cause the at least one computing device to at least:
identify a plurality of available GPUs, wherein the subset of the plurality of GPUs correspond to the plurality of available GPUs; and
determine the plurality of predicted interferences comprising a respective predicted interference for a respective one of the plurality of available GPUs.

5. The system of claim 4, wherein the machine readable instructions, when executed by the at least one processor, cause the at least one computing device to at least:
input at least one baseline parameter for the respective one of the plurality of available GPUs to determine the respective predicted interference.

6. The system of claim 5, wherein the parameters input into the interference model further comprise at least one baseline parameter for the particular workload.

7. The system of claim 1, wherein the interference model identifies a one-to-one interference between two workloads, and the predicted interference identified as an output from the interference model corresponds to a worst-case predicted interference among at least one interference calculated for the at least one workload currently assigned to the particular GPU.

8. A method comprising:
identifying kernel length types for kernels of a respective one of at least one workload, wherein a respective kernel is identified as a short kernel or a long kernel based at least in part on a comparison of an execution time of the respective kernel to a time slice;
providing, by a scheduling service executed by at least one computing device, parameters comprising at least one baseline parameter for the respective one of the at least one workload currently assigned to a particular graphics processing unit (GPU) into an interference model that predicts interference between a particular workload and the at least one workload of the particular GPU in a computing environment comprising a plurality of GPUs, wherein the particular GPU uses the time slice for context switching;
identifying, by the scheduling service, an output from the interference model, the output comprising a predicted interference to place a workload on the particular GPU; and
assigning, by the scheduling service, the workload to the particular GPU based on the predicted interference corresponding to a minimum predicted interference among a plurality of predicted interferences for at least a subset of the plurality of GPUs.

9. The method of claim 8, wherein the at least one baseline parameter comprises at least one of: an average kernel length, an average long kernel length indicating an average of long kernels that execute for longer than the time slice, and a ratio between a first number of short kernels that execute within the time slice length of the particular GPU and a second number of the long kernels that execute for longer than the time slice length.

10. The method of claim 9, wherein the at least one baseline parameter further comprises at least one of: a GPU utilization, a peripheral component interconnect express (PCIe) read bandwidth, a PCIe write bandwidth, a virtual central processing unit (vCPU) utilization, and a workload memory utilization for the at least one workload.

11. The method of claim 8, further comprising:
training a plurality of interference models to predict interference based on measured interferences and a respective set of the at least one baseline parameter corresponding to a respective one of a plurality of workloads comprising the workload.

12. The method of claim 8, further comprising:
determining that the interference model comprises a minimum error of a plurality of errors for a plurality of interference models; and
selecting the interference model to process the workload.

13. The method of claim 12, wherein the minimum error is a minimum average error, a minimum median error, or a minimum mode error.

14. The method of claim 8, wherein the at least the subset of the plurality of GPUs corresponds to a set of available GPUs for the workload within the computing environment.

15. A non-transitory computer-readable medium comprising machine readable instructions, wherein the instructions, when executed by at least one processor, cause at least one computing device to at least:
identify kernel length types for kernels of a respective one of at least one workload, wherein a respective kernel is identified as a short kernel or a long kernel based at least in part on a comparison of an execution time of the respective kernel to a time slice;
provide, by a scheduling service executed by the at least one computing device, parameters comprising at least one baseline parameter for the respective one of the at least one workload currently assigned to a particular graphics processing unit (GPU) into an interference model that predicts interference between a particular workload and the at least one workload of the particular GPU in a computing environment comprising a plurality of GPUs, wherein the particular GPU uses the time slice for context switching;

identify, by the scheduling service, an output from an interference function, the output comprising a predicted interference to place a workload on the particular GPU; and assign, by the scheduling service, the workload to the particular GPU based on a comparison of the predicted interference to a plurality of predicted interferences for at least a subset of the plurality of GPUs.

16. The non-transitory computer-readable medium of claim 15, wherein the at least one baseline parameter comprises at least one of: an average kernel length, an average long kernel length indicating an average of long kernels that execute for longer than the time slice, and a ratio between a first number of short kernels that execute within the time slice length of the particular GPU and a second number of the long kernels that execute for longer than the time slice length.

17. The non-transitory computer-readable medium of claim 16, wherein the at least one baseline parameter further comprises at least one of: a GPU utilization, a peripheral component interconnect express (PCIe) read bandwidth, a PCIe write bandwidth, a virtual central processing unit (vCPU) utilization, and a workload memory utilization for the at least one workload.

18. The non-transitory computer-readable medium of claim 15, wherein the machine readable instructions, when executed by the at least one processor, cause the at least one computing device to at least:
identify a plurality of available GPUs, wherein the subset of the plurality of GPUs correspond to the plurality of available GPUs; and
determine the plurality of predicted interferences comprising a respective predicted interference for a respective one of the plurality of available GPUs.

19. The non-transitory computer-readable medium of claim 18, wherein the machine readable instructions, when executed by the at least one processor, cause the at least one computing device to at least:
input at least one baseline parameter for the respective one of the plurality of available GPUs to determine the respective predicted interference.

20. The non-transitory computer-readable medium of claim 15, wherein the interference function identifies a one-to-one interference between two workloads, and the predicted interference identified as an output from the interference function corresponds to a worst-case predicted interference among at least one interference calculated for the at least one workload currently assigned to the particular GPU.

* * * * *